United States Patent
Feng et al.

(10) Patent No.: US 12,097,692 B2
(45) Date of Patent: Sep. 24, 2024

(54) ELECTRONIC DEVICE COMPRISING A PRESSURE SENSOR

(71) Applicant: Peratech Holdco Limited, North Yorkshire (GB)

(72) Inventors: Xu Feng, Jiansu (CN); Cao Jin, Jiansu (CN); Sun Kun, Jiansu (CN); Wei Xin, Jiansu (CN)

(73) Assignee: Peratch Holdco Limited, North Yorkshire (GB)

( * ) Notice: Subject to any disclaimer, the term of this patent is extended or adjusted under 35 U.S.C. 154(b) by 0 days.

(21) Appl. No.: 17/794,345

(22) PCT Filed: Jan. 20, 2021

(86) PCT No.: PCT/GB2021/000005
§ 371 (c)(1),
(2) Date: Jul. 21, 2022

(87) PCT Pub. No.: WO2021/148772
PCT Pub. Date: Jul. 29, 2021

(65) Prior Publication Data
US 2023/0142704 A1    May 11, 2023

(30) Foreign Application Priority Data
Jan. 21, 2020   (CN) .......................... 202020134930.7

(51) Int. Cl.
| G06F 3/041 | (2006.01) |
| B32B 7/02  | (2019.01) |
| B32B 7/12  | (2006.01) |
| B32B 9/00  | (2006.01) |

(52) U.S. Cl.
CPC .................. *B32B 9/00* (2013.01); *B32B 7/02* (2013.01); *B32B 7/12* (2013.01); *G06F 3/041* (2013.01); *B32B 2250/02* (2013.01); *B32B 2307/51* (2013.01); *B32B 2457/208* (2013.01)

(58) Field of Classification Search
CPC ............................................. G06F 2203/04105
See application file for complete search history.

(56) References Cited

U.S. PATENT DOCUMENTS

| 2018/0081466 A1* | 3/2018 | Moon .................. H10N 30/302 |
| 2018/0143718 A1* | 5/2018 | Kim ...................... G06F 3/0447 |
| 2020/0396832 A1* | 12/2020 | Yamashita .......... G06F 3/04164 |

OTHER PUBLICATIONS

Corresponding International Patent Application No. PCT/GB2021/000005, International Search Report dated May 3, 2021.
Corresponding International Patent Application No. PCT/GB2021/000005, International Preliminary Report of Patentability dated Apr. 5, 2022.

* cited by examiner

*Primary Examiner* — Nan-Ying Yang
(74) *Attorney, Agent, or Firm* — Cooper Legal Group LLC

(57) ABSTRACT

An apparatus for use in the assembly of an electronic device, such as a mobile telephone, comprises a pressure sensor. The pressure sensor is embedded within an inner elastic layer and the inner elastic layer is embedded within an outer elastic layer. The inner elastic layer has an elastic modulus which is greater than the elastic modulus of the outer elastic layer.

11 Claims, 8 Drawing Sheets

ELECTRONIC DEVICE COMPRISING A PRESSURE SENSOR

CROSS REFERENCE TO RELATED APPLICATIONS

This application claims priority from Chinese Utility Model number ZL 2020 2 0134930.7, filed on 21 Jan. 2020, the whole contents of which are incorporated herein by reference.

BACKGROUND OF THE INVENTION

The present invention relates to an apparatus for use in the assembly of an electronic device, a touch screen and electronic device comprising such apparatus and a method of assembling an electronic device.

In the development of touch screen consumer electronics, micro pressure sensors are becoming increasingly applied to electronic devices such as mobile telephones. In the manufacture of electronic assemblies in this field, components are typically assembled by means of tolerance control.

During manufacture, due to processing conditions and cost-constraints, the tolerances on various parts and components can have a significant influence. This is particularly pertinent when dealing with small and thin film pressure sensors, in which a problem of accumulation of tolerances of various components occurs when the pressure sensor is included in the assembly.

BRIEF SUMMARY OF THE INVENTION

According to a first aspect of the present invention, there is provided an apparatus for use in the assembly of an electronic device.

According to a second aspect of the present invention, there is provided a method of assembling an electronic device.

With the apparatus as claimed, the pressure sensor is embedded in the inner elastic layer, and the inner elastic layer is embedded in the outer elastic layer. When the pressure sensor is assembled, the elasticity of the elastic layers is used to overcome any assembly tolerances. This therefore solves the problem of a large accumulation of tolerances of various components when assembling pressure sensors, overcomes the accumulation of assembly tolerances between parts, and ensures that the pressure sensors can be assembled correctly in mass production.

Additionally, as the elastic modulus and Poisson's ratio of the two elastic layers are different, it is convenient to adjust the force state of the elastic layers and the pressure sensor so as to optimize the response of the pressure sensor during touch.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
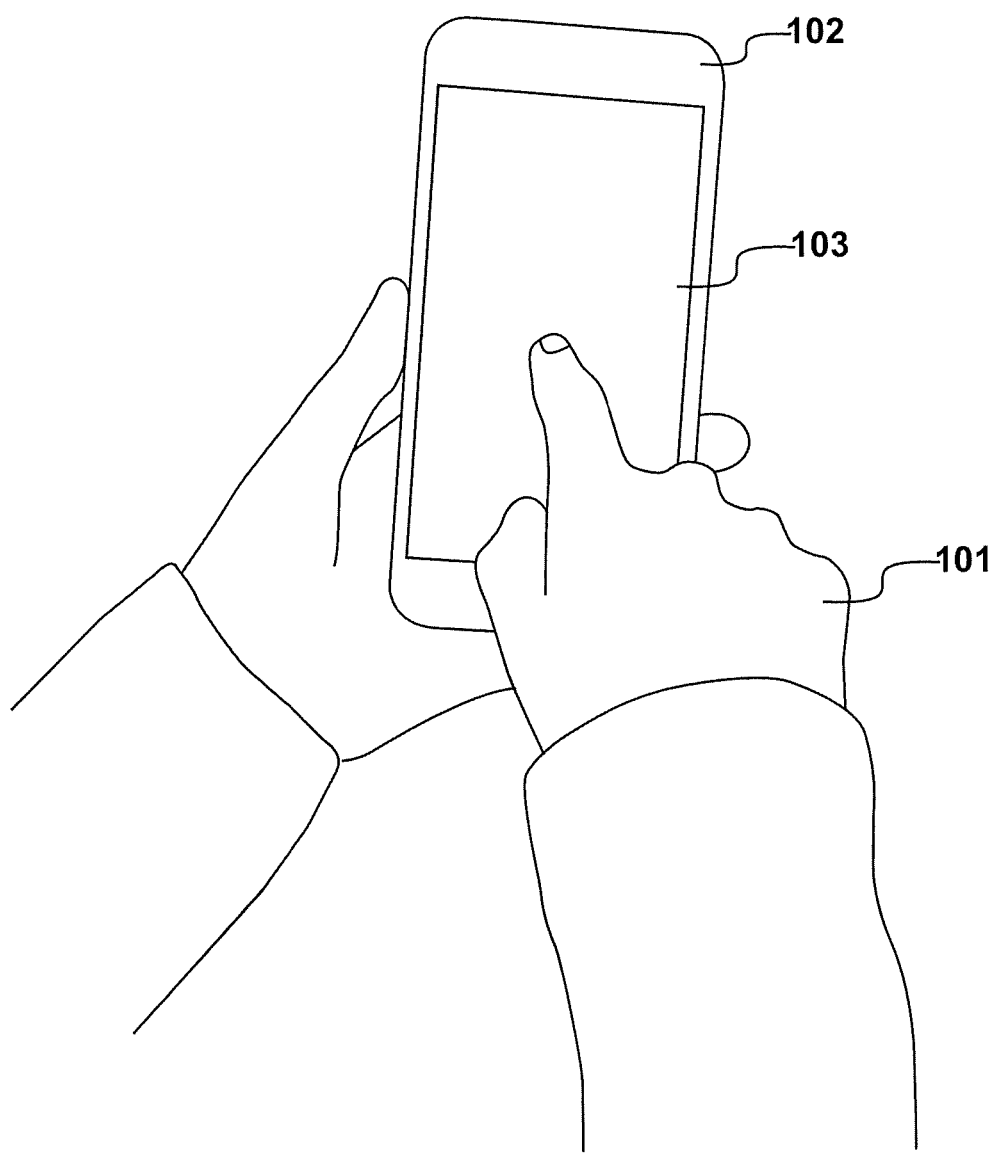
FIG. 1 shows an electronic device in the form of a mobile telephone in accordance with the present invention.

Apparatus for use with an electronic device in accordance with the present invention may be incorporated into an electronic device such as a mobile telephone in the manner of FIG. 1.

In the embodiment of FIG. 1, a user 101 is shown utilizing an electronic device 102 in which electronic device 102 is a mobile telephone.

In the embodiment, mobile telephone 102 comprises a touch screen 103. User 101 can therefore utilize mobile telephone 102 in a conventional manner by applying a pressure by means of their finger to operate mobile telephone 102.

In the mobile telephone 102 in accordance with the invention, mobile telephone 102 comprises and apparatus comprising a pressure sensor embedded into an elastic body. The arrangement as will be described herein ensures that, during assembly of mobile telephone 102, tolerances can be overcome due to the improved elasticity arising from the present invention and arrangement of the pressure sensor in the elastic body. This addresses the issues typically experienced during assembly due to the large accumulation of tolerances when assembly multiple components in one electronic device. Thus, an improved assembly is provided which assists in the mass production of devices of this type.

FIG. 2

Figure 2:
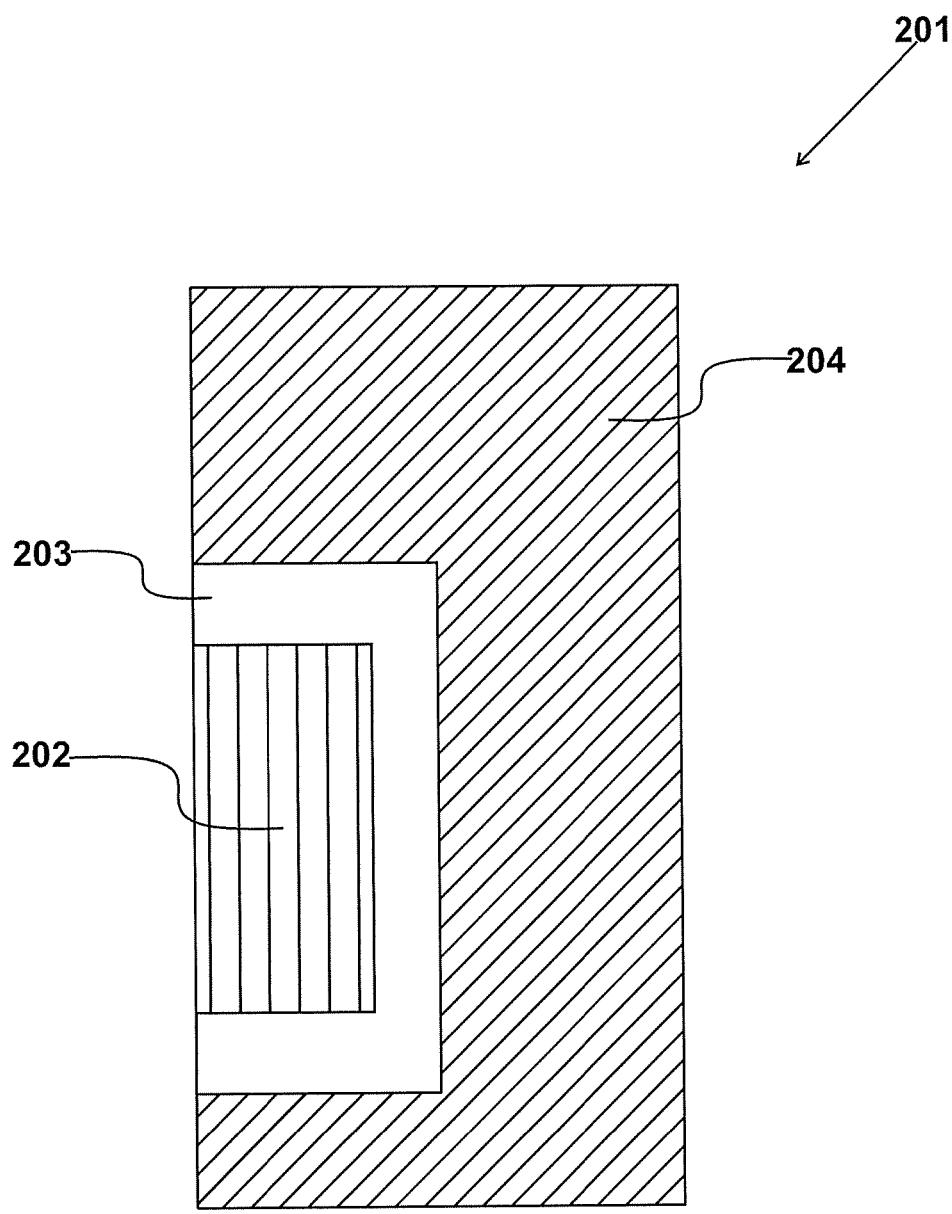
FIG. 2 shows a structural schematic diagram of an apparatus in accordance with an embodiment of the present invention.

As shown in FIG. 2, an embodiment of the present invention provides an apparatus 201, which comprises a pressure sensor 202, an inner elastic layer 203, and an outer elastic layer 204. Pressure sensor 202 is embedded in inner elastic layer 203. Inner elastic layer 203 is further embedded in outer elastic layer 204.

In the embodiment, inner elastic layer 203 and outer elastic layer 204 have different elastic moduli. The elastic modulus of inner elastic layer 203 is greater than the elastic modulus of the outer elastic layer 204.

Thus, in the example shown, pressure sensor 202 is embedded in the elastic layer 203, and elastic layer 203 is embedded in elastic layer 204. When the pressure sensor 202 is assembled, the elasticity of the elastic layers is used to overcome the assembly tolerances which occur in manufacture, as will be described further with respect to FIGS. 7 and 8. The structure therefore solves the problem of a large accumulation of tolerances of various components when assembling the pressure sensor and additionally overcomes the accumulation of assembly tolerances between parts.

Additionally, elastic layer 203 and elastic layer 204 also have different Poisson's ratios, which facilitates the adjustment of force properties of the elastic layers and consequently the pressure sensor, thereby optimizing the response performance of the pressure sensor during touch.

In an embodiment, pressure sensor 202 is embedded in the middle of inner elastic layer 203 and may be considered as being embedded in the edge of inner elastic layer 203. Similarly, inner elastic layer 203 can be considered as being embedded in the middle of outer elastic layer 204 or embedded in the edge of outer elastic layer 204.

When the pressure sensor 202 and inner elastic layer 203 are both embedded at the edge, the recognition accuracy of the pressure sensor can be improved.

In addition, the size of inner elastic layer 203 can be adaptively adjusted according to the size of pressure sensor 202. In an embodiment, inner elastic layer 203 is slightly larger than pressure sensor 202.

FIG. 3

Figure 3:
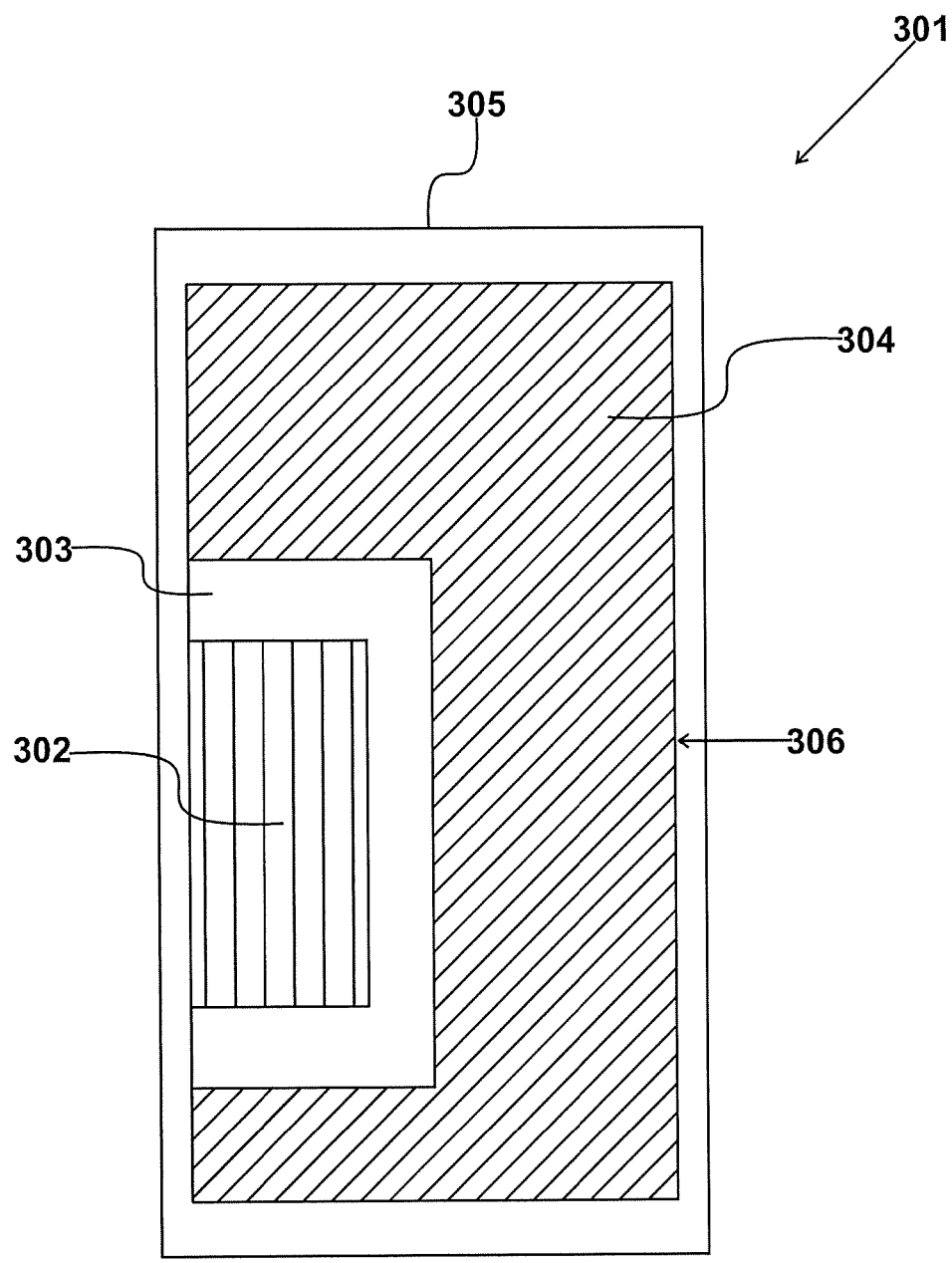
FIG. 3 shows a structural schematic diagram of an alternative apparatus in accordance with an alternative embodiment of the present invention.

In an alternative embodiment, as shown in FIG. 3, an alternative apparatus 301 comprises a pressure sensor 302, an inner elastic layer 303 into which pressure sensor 302 is embedded and outer elastic layer 304. In this embodiment, outer elastic layer 304 comprises an elastic layer that has a viscous effect by itself, for example, it may be an elastic layer formed of substantially viscous glue.

Thus, in the embodiment of FIG. 3, in addition to the aforesaid outer elastic layer 304 having a viscous effect, an adhesive layer 305 is provided on the surface of outer elastic layer 304. Adhesive layer 305 provides the surface 306 of outer elastic layer 304 with increased adhesion, and thus, during assembly, adhesive layer 305 assists outer elastic layer 304 to adhere to other components. Further, outer elastic layer 304 can also be stretched when the tolerance of the two components is large, thereby overcoming the influence of the tolerance on the assembly.

For example, during assembly, outer elastic layer 304 is arranged between two components (as will be described further with respect to FIG. 7), and the tolerance between the two components is larger than the thickness of outer elastic layer 304. In this example, outer elastic layer 304 is provided with adhesive layer 305 on its surface 306. Thus, when outer elastic layer 304 is installed with the components, adhesive layer 305 can be utilized to adhere outer elastic layer 304 to those components. In this way, due to the large tolerance between the two components, and given outer elastic layer 304 is positioned between the two components, it presents an expanded state, thereby overcoming the problem of installation tolerances between components.

It is appreciated that, while the previous example provides an outer elastic layer having a viscous effect, outer elastic layer 304, in alternative embodiments, comprises an elastic layer without a viscous effect, for example, such as a rubber material or similar. However, this embodiment may still comprise a substantially similar outer adhesive layer 305.

In this embodiment, either the surface 306 of outer elastic layer 304 is viscous or the surface of outer elastic layer is provided with an adhesive layer 305, so that the outermost surface of the outer elastic layer has an adhesion effect. Outer elastic layer 304 is therefore utilized to attach between components, and outer elastic layer 304 can therefore be stretched to overcome the tolerance problem between component or part assembly, so that the installation of the sensor will not be affected by the tolerance between the parts.

FIG. 4

Figure 4:
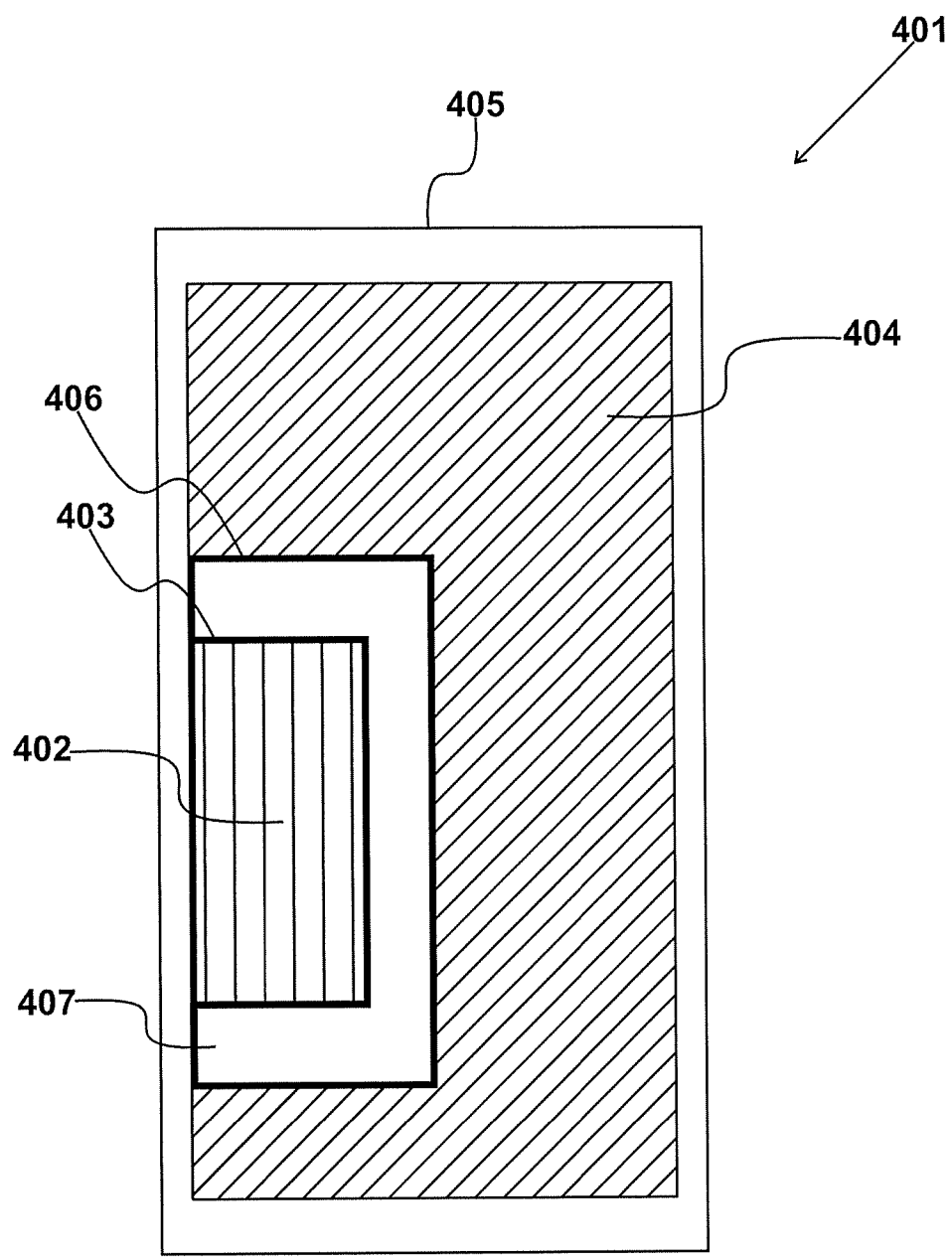
FIG. 4 shows a further structural schematic diagram of a further alternative apparatus in accordance with a further embodiment of the present invention.

In a further embodiment, as shown in FIG. 4, an apparatus 401 comprises a pressure sensor 402, an inner elastic layer 403 into which pressure sensor 402 is embedded and outer elastic layer 404. In the embodiment, apparatus 401 further comprises an adhesive layer 405.

In this embodiment, a second adhesive layer 406 is provided between inner elastic layer 403 and outer elastic layer 404.

An adhesive layer 407 is also provided between inner elastic layer 403 and pressure sensor 402. In this way, the connection between inner elastic layer 403 and outer elastic layer 404 and the connection between inner elastic layer 403 and pressure sensor 402 is improved and made stronger such that the apparatus retains its structure.

It is appreciated that variations in the embodiments of any of FIGS. 2 to 4 may also fall within the claimed invention. Thus, any of the apparatus 201, 301, 401 may comprise any of the features as appropriate from the other embodiments. For example, an embodiment comprising an adhesive layer between the pressure sensor and the inner elastic layer but without an adhesive layer on the outer elastic layer would be possible. In the embodiment of FIG. 4, outer elastic layer 404 may also be substantially viscous or otherwise as per apparatus 201. Other variations may also be anticipated by the invention.

FIG. 5

Figure 5:
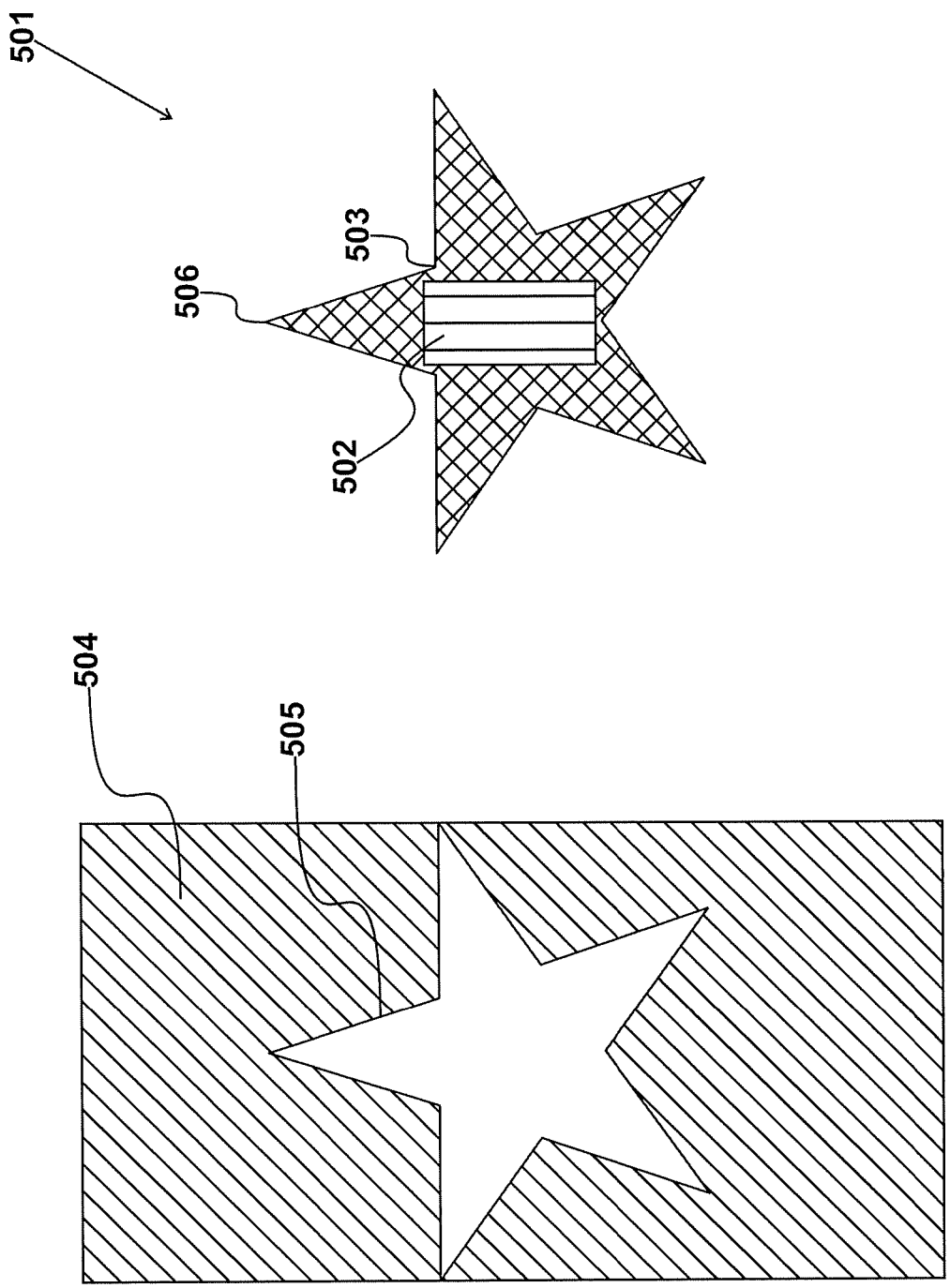
FIG. 5 shows a still further structural schematic diagram of a still further apparatus in accordance with a still further embodiment of the present invention.

A further apparatus 501, in accordance with a further embodiment of the present invention is now shown in respect to FIG. 5. Apparatus 501 comprises a pressure sensor 502, inner elastic layer 503 and outer elastic layer 504. In FIG. 5, apparatus 501 is shown in schematic exploded form with elastic layers 503 and 504 separate to each other. In use, it is appreciated that elastic layers 503 and 504 would be in contact with each other.

In the embodiment of FIG. 5, a plurality of grooves 505 is provided in an outer elastic layer 504, and a plurality of protrusions 506 is provided in inner elastic layer 503.

In the embodiment, the number of protrusions 506 and the number of grooves 505 are identical. In addition, the protrusions 506 and grooves 505 comprise mutually corresponding shapes.

Thus, inner elastic layer 503 can be embedded into outer elastic later 504 by inserting the plurality of protrusions 506 into the corresponding grooves 505. In this way, the arrangement between elastic layer 503 and elastic layer 504 results in a connection of increased strength.

FIG. 6

Figure 6:
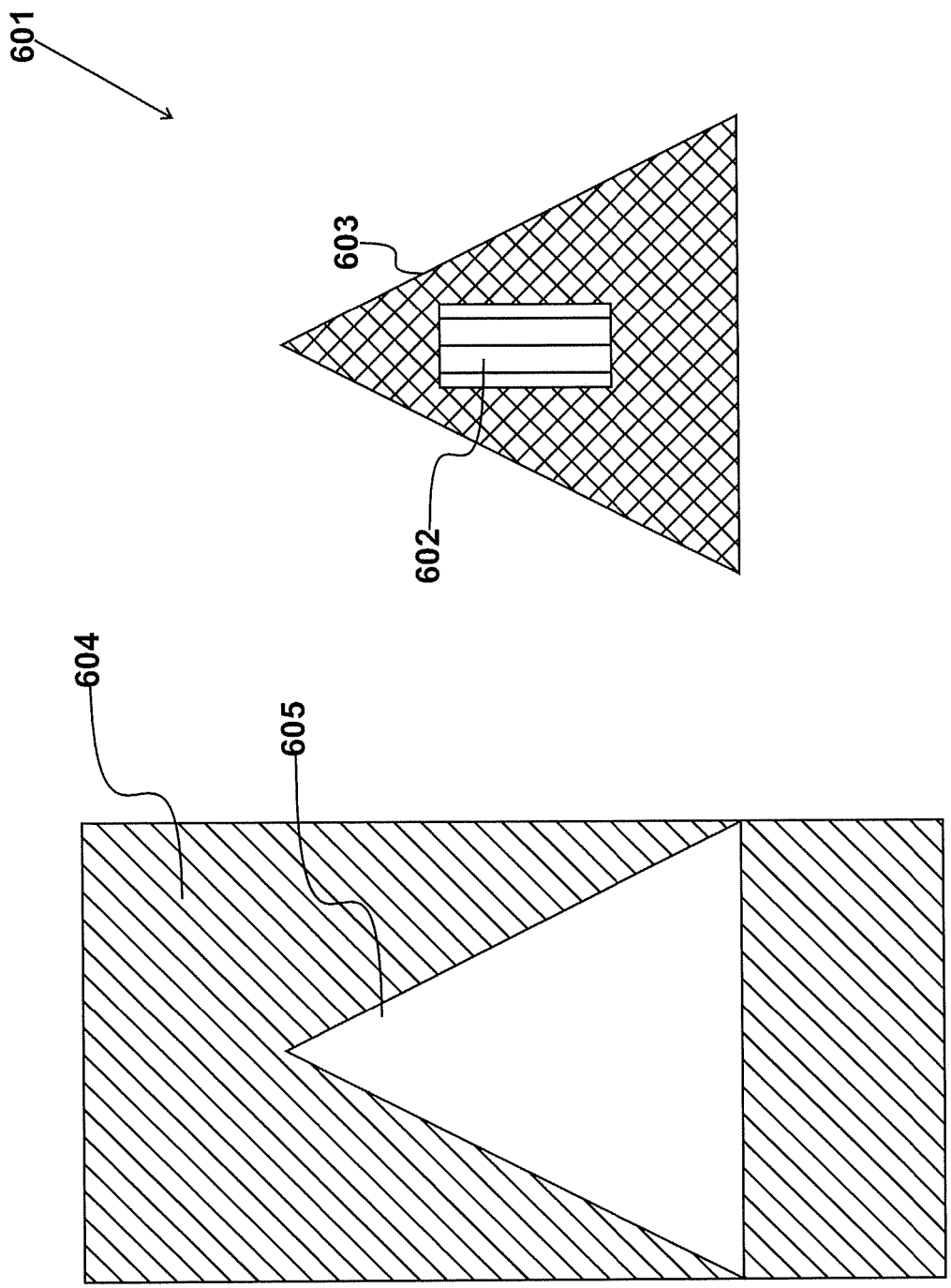
FIG. 6 shows a structural schematic diagram of a further alternative apparatus in accordance with a fifth embodiment of the present invention.

A still further apparatus 601, in accordance with a further embodiment of the present invention is now shown in respect to FIG. 6. Apparatus 601 comprises a pressure sensor 602, inner elastic layer 603 and outer elastic layer 604. In FIG. 6, apparatus 601 is shown in schematic exploded form with elastic layers 603 and 604 separate to each other in a substantially similar manner to FIG. 5. In use, it is appreciated that elastic layers 603 and 604 would be in contact with each other.

In the embodiment of FIG. 6, a groove 605 is provided in outer elastic layer 604. In the embodiment, the shape of groove 605 is identical to that of inner elastic layer 603 such that elastic layer 603 is mutually co-operable with groove 605.

In the embodiment, groove 605 is slightly larger than inner elastic layer 603, such that inner elastic layer 603 can be positioned in groove 605 and fixed in position in groove 605. In this way, the connection between inner elastic layer 603 and outer elastic layer 604 is made stronger and is retained securely in use.

It is appreciated that that the examples shown in FIGS. 5 and 6 are suitable examples in accordance with the invention. It is appreciated that any other alternative shapes may be utilized.

In the embodiments herein described, the shape of inner elastic layer and outer elastic layer is substantially square or rectangular-shaped. In this way, the shape of the apparatus ensures that the apparatus can meet design needs, in particular as the areas in which the pressure sensors may be applied between components are often elongated in nature. In further embodiments, however, the shape of the layers may be any other suitable shape to meet design requirements.

FIG. 7

Figure 7:
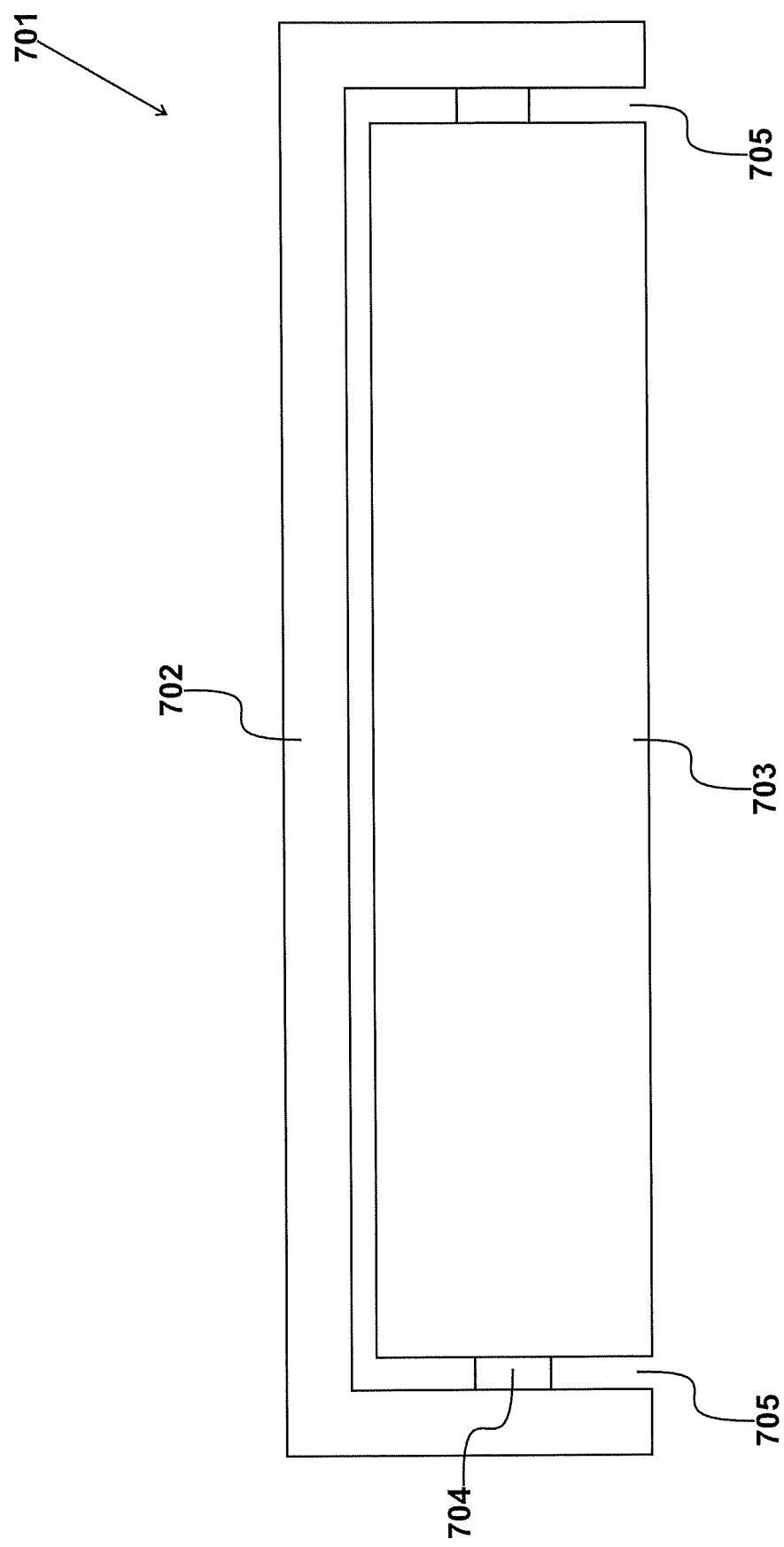
FIG. 7 shows a structural schematic diagram of a touch screen comprising an apparatus of the present invention.

Any of the apparatus 201, 301, 401, 501 or 601 described in respect of FIGS. 2 to 6 can be implemented and incorporated into a touch screen as indicated in FIG. 1. As shown in FIG. 7, touch screen 701 comprises a screen 702 and a screen frame 703 onto which screen 702 fits.

Touch screen 701 further comprises an apparatus 704, which may be substantially similar to any of the aforementioned apparatus 201, 301, 401, 501 or 601 described herein. Thus, apparatus 704 comprises a pressure sensor, an inner elastic layer and an outer elastic layer.

Apparatus 704 is arranged between the screen 702 and screen frame 703. When screen 702 and screen frame 703 are assembled, a gap 705 is present between screen 702 and screen frame 703. Gap 705 provides a tolerance.

When gap 705 between screen 702 and screen frame 703 is relatively large, and consequently considered to have a large tolerance, compression of the apparatus 704 is reduced and may be considered to be in a free or stretched state. Alternatively, when gap 705 between screen 702 and screen frame 703 is relatively small, that is, when the tolerance is small, the apparatus 704 assumes a compressed state.

Thus, apparatus 704 reduces the influence of tolerances when a pressure sensor is installed on a touch screen, thereby overcoming the tolerance problem herein while providing an accurate installation of the pressure sensor. Further, as the elastic modulus and Poisson's ratio between the two elastic layers are different, the force state of the elastic layers and the pressure sensor can be more easily adjusted, thereby enabling optimization of the response of the pressure sensor during touch events.

In the touch screen example of FIG. 7, because the touch screen contains the apparatus of the present invention, the force sensor can be embedded effectively in an elastic body meaning that it is the elastic body itself which is used during assembly. The elasticity of the apparatus allows the issues with tolerances during assembly to be overcome thereby solving the problem of accumulation of tolerances of each component when assembling multiple micro-sensors in a given electronic device. The arrangement further ensures that the pressure sensor is implemented correctly during mass assembly processes while also facilitating adjustment of the force state of the elastic layers and the pressure sensor, due to the differences in the elastic modulus and Poisson's ratio of the elastic layers. As noted, the response of the pressure sensor during a touch even can therefore be optimized.

FIG. 8

Figure 8:
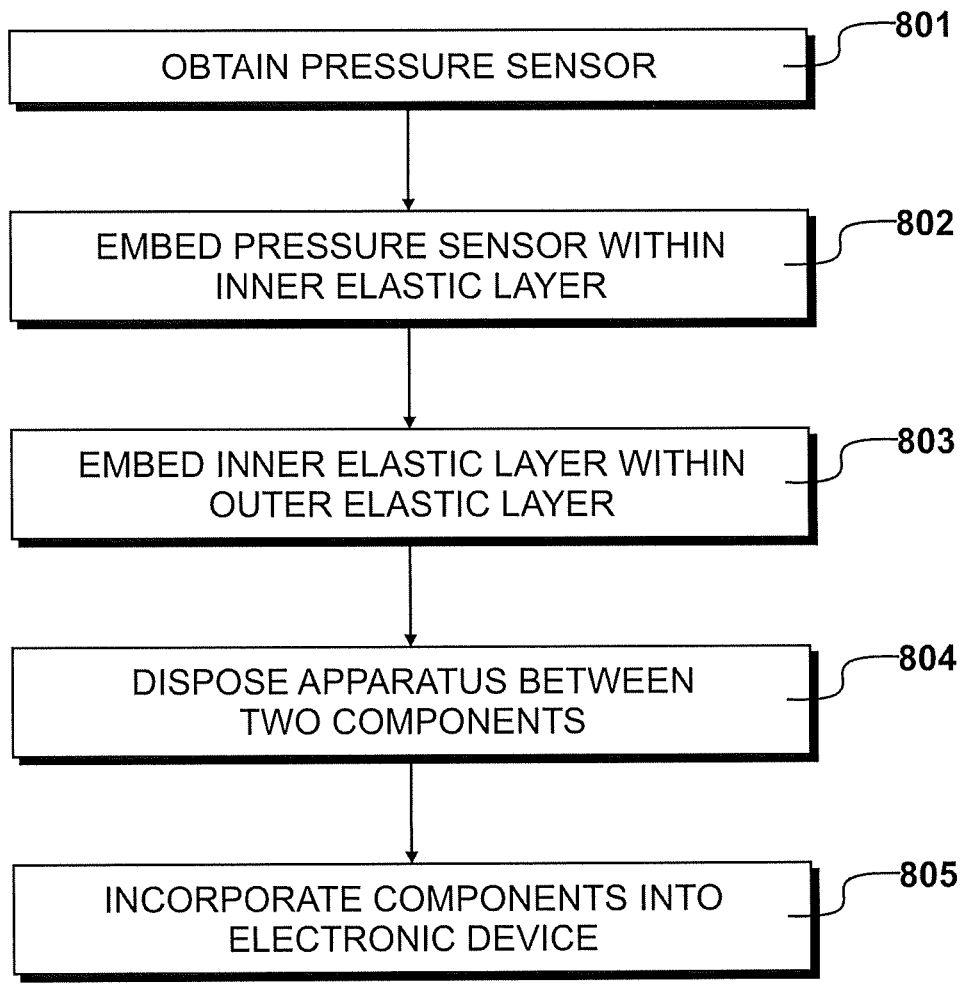
FIG. 8 shows a method of assembling an electronic device.

A schematic flow chart indicating a method of assembling an electronic device, such as mobile telephone 102 and implementation of the aforementioned apparatus into such and electronic device will now be described with respect to FIG. 8.

At step 801, a suitable pressure sensor is obtained. In an embodiment, the pressure sensor is a conventional thin film pressure sensor, although it is appreciated that, any suitable pressure sensor may be utilized.

The pressure sensor is then embedded into an inner elastic layer having a given elastic modulus at step 802. At step 803, an outer elastic layer is provided and the inner elastic layer having the first elastic modulus is embedded into the outer elastic layer having a second elastic modulus. In particular, the elastic modulus of the outer elastic layer is lower than the elastic modulus of the inner elastic layer. Conversely, it can be said that the inner elastic layer has an elastic modulus greater than the outer elastic layer. This step forms the apparatus of the present invention.

The apparatus comprising the pressure sensor, inner elastic layer and outer elastic layer are disposed between a first component and a second component of an electronic device at step 804. This includes the example described with respect to FIG. 7, in which the two components are the touch screen and screen frame which receives the touch screen respectively.

The process is completed by incorporating the components, such as the screen and screen frame into an electronic device, such as mobile telephone 102 of FIG. 1.

It is appreciated that, in specific embodiments, additional steps are included to provide additional layers, such as the adhesive layers described herein. For example, an adhesive layer may be provided between the pressure sensor and the inner elastic layer as part of step 802. Further, an adhesive layer may be provided following step 803 to the outside surface of the outer elastic layer. It is further appreciated that the outside surface of the outer elastic layer may be provided with the adhesive layer prior to step 803 in which the outer elastic layer is embedded.

The invention claimed is:

1. Apparatus for incorporating into an electronic device, comprising:
   a pressure sensor;
   an inner elastic layer and an outer elastic layer;
   said pressure sensor being embedded within said inner elastic layer and said inner elastic layer being embedded within said outer elastic layer; wherein:
   said inner elastic layer has an elastic modulus which is greater than an elastic modulus of said outer elastic layer,
   said outer elastic layer comprises a plurality of grooves;
   said inner elastic layer comprises a plurality of protrusions identical in number to said plurality of grooves;
   each said plurality of protrusions mutually connect and co-operate with each said plurality of grooves; and
   said outer elastic layer comprises a substantially viscous elastic material such that said outer elastic layer is configured to be utilized to attach between two components and stretched to overcome an influence of tolerances on said pressure sensor and a gap between said two components.

2. The apparatus of claim 1, wherein said outer elastic layer comprises a surface to which a first adhesive layer is provided.

3. The apparatus of claim 1, further comprising a second adhesive layer provided between said inner elastic layer and said outer elastic layer.

4. The apparatus of claim 1, further comprising a third adhesive layer provided between said inner elastic layer and said pressure sensor.

5. The apparatus of claim 1, wherein said inner elastic layer and said outer elastic layer each comprise a substantially rectangular-shaped structure.

6. A touch screen, comprising:
a screen;
a screen frame configured to receive said screen; and
the apparatus of claim 1.

7. The touch screen of claim 6, wherein said apparatus is disposed between said screen and said screen frame.

8. An electronic device comprising the touch screen of claim 6.

9. The electronic device of claim 8, wherein said electronic device is a mobile telephone.

10. A method of assembling an electronic device, said method comprising the steps of:
embedding a pressure sensor within an inner elastic layer having an elastic modulus and having a plurality of protrusions;
embedding said inner elastic layer comprising said pressure sensor within an outer elastic layer having an elastic modulus lower than said elastic modulus of said inner elastic layer, said outer elastic layer comprising a plurality of grooves identical in number to said plurality of protrusions and further comprising a substantially viscous elastic material;
connecting said plurality of protrusions to mutually connect and co-operate with each said plurality of grooves; and
disposing said pressure sensor, said inner elastic layer and said outer elastic layer between a first component and a second component of an electronic device, and stretching said outer elastic layer to overcome an influence of tolerances on said pressure sensor and a gap between said first component and said second component.

11. The method of claim 10, wherein said first component is a screen of a touch screen and said second component is a screen frame which receives said screen.

* * * * *